Jan. 4, 1927.
E. WISROTH
PASTE DISPENSING DEVICE
Filed Oct. 2, 1924
1,613,368
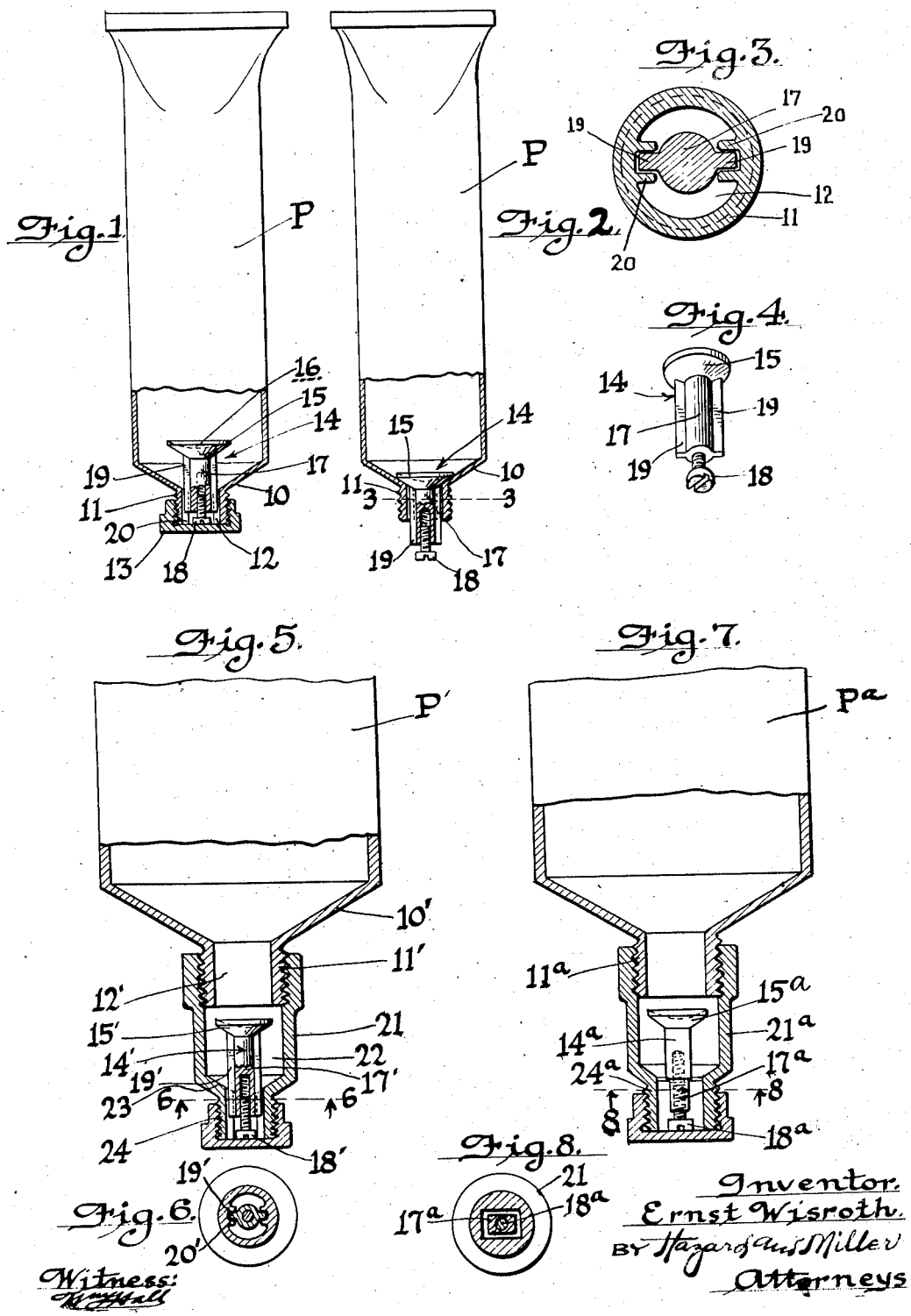

Patented Jan. 4, 1927.

1,613,368

UNITED STATES PATENT OFFICE.

ERNST WISROTH, OF LOS ANGELES, CALIFORNIA.

PASTE-DISPENSING DEVICE.

Application filed October 2, 1924. Serial No. 741,187.

This invention is an improvement over the device disclosed in my co-pending application, Serial No. 656,936, filed August 11, 1923.

It is an object of this invention to provide a paste dispensing tube with a closure which will automatically close during the dispensing of the paste from the tube so that only a given amount of paste may be withdrawn from the tube at one time.

A further object of this invention is to provide a means for adjusting the closure so that the amount discharged from the tube at one time may be varied.

A still further object of this invention is to provide an attahcment for tubes of conventional construction in which a closure is mounted which is adjustable and which will limit the amount of paste being discharged from the tube at one time.

With the foregoing and other objects in view which will be made manifest in the following detailed description and pointed out in the appended claims, reference is had to the accompanying drawings for an illustrative embodiment of the invention, wherein:

Figure 1 is a side elevation, parts being broken away and shown in section, of a paste dispensing tube showing the improved closure therein, Fig. 2 is a view similar to Fig. 1, the closure being shown in closing position, Fig. 3 is a horizontal section taken substantially upon the line 3—3 of Fig. 2, Fig. 4 is a positive view of the closure shown in Figs. 1 and 2, Fig. 5 is a partial side elevation, parts being broken away and shown in section, of a paste dispensing tube provided with an attachment in which a closure is provided, Fig. 6 is a horizontal section taken substantially upon the line 6—6 of Fig. 5, Fig. 7 is a view similar to Fig. 5, showing a modified form, and Fig. 8 is a horizontal section taken substantially upon the line 8—8 of Fig. 7.

Referring to the accompanying drawings wherein similar reference characters designate similar parts throughout, a paste dispensing tube P which may be formed of malleable metal, such as lead, is provided with a conical top 10 having a threaded nipple 11 in which is provided a passage 12 through which the paste within the paste tube P is discharged. A suitable cap 13 is adapted to be threaded on to the nipple 11 to close the tube P.

Within the tube there is disposed a closure, generally designated at 14, which is formed of a conical head 15 provided with a concaved back 16, as indicated by dotted lines in the figures. A shank 17 is integral with the head 15 and is provided with an adjusting screw 18. Side ribs 19 are formed upon the sides of the shank 17 which side ribs are disposed between guides 20 formed upon the interior surfaces of the nipple 11.

The operation of the paste tube shown in Figs. 1 to 4 inclusive is as follows: The cap 13 having been removed from the nipple 11, the paste tube P may be squeezed, thereby forcing paste outwardly through the passage 12 about the shank 17. The outward movement of the paste causes the closure 14 to slide downwardly within the passage 12 so that the conical head 15 engages the interior surfaces of the conical top 10, thereby cutting off or preventing further discharge of paste through the passage 12. When the cap 13 is again applied, the closure 14 is forced back within the paste tube P and upon removal of the cap 13, another quantity of paste may be discharged from the paste tube P, as before. The amount of paste discharged from the paste tube P may be varied by adjusting the adjusting screw 18. Obviously, if the adjusting screw 18 is practically withdrawn from the shank 17, the engagement with the cap 13 will force the closure 14 farther within the tube P than if the adjusting screws were practically enclosed within the shank 17. The ribs 19 of the guides 20 serve to prevent rotation of the shank 17 while the adjecting screw 18 is being turned during adjusting.

In Fig. 5 I have disclosed a modified form wherein the paste tube P' is provided with a conical top 10' having a threaded nipple 11', through which there is formed a passage 12'. The length of the passage 12' is increased by applying an attachment 21 which is threaded on to the nipple 11' and has a passage 22 formed therein. A conical seat 23 is formed upon the interior of the attachment 21, which is adapted to receive or seat the conical head 15' of the closure 14'. The shank carries ribs 19' between guides 20' formed upon the interior of the nipple portion 24 of the attachment 21.

The shank 17' is also provided with an adjusting screw 18', as before. The operation of the device disclosed in Fig. 5 is practically the same as that of the device shown in Figs. 1 and 2. The attachment 21 and the closure 14' are designed so as to be applied to paste tubes of conventional construction, which have not been provided with closures 14, as shown in Figs. 1 and 2.

In Fig. 7 a similar attachment $21^a$ is mounted upon the paste tube $P^a$ carrying a closure $14^a$ similar in construction to the closures 14 and 14'. The shank $17^a$ as shown in Fig. 8 is rectangular in construction and the interior of the nipple portion $24^a$ of the attachment $21^a$ is rectangular in form. The paste from within the paste tube $P^a$ passes outwardly through the nipple $11^a$ into the attachment $21^a$ and outwardly through the nipple $24^a$ about the shank $17^a$. The closure $14^a$ is provided with an adjusting screw $18^a$, as before. In the device shown in Fig. 7, the square or rectangular shaped shank $17^a$ is designed to prevent rotation of the closure $14^a$ while the adjusting screw $18^a$ is being adjusted. This form of passage within the nipple $24^a$ of the attachment $21^a$ enables a ribbon of paste to be discharged from the tube, whereas in the forms shown in Figs. 1 and 5, a round stream of paste is discharged from the tube.

The heads 15, 15' and $15^a$ are preferably concaved so that paste may easily engage the concaved surface and force the closure outwardly through the passages. This has the advantage over a closure having a rounded head or convex head for the reason that heads of such form permit the paste to slide by the closure without forcing the closure outwardly.

It will be understood that various changes may be made in the detail of construction without departing from the spirit or scope of the invention as defined by the appended claims.

I claim:

1. A paste container having a passage through which paste is adapted to be discharged, a cap for said passage, a closure for said passage comprising a shank carrying a head disposed within the paste, said closure being adapted to be forced outwardly by the discharge of said paste thereby stopping the discharge of said paste, said cap being adapted to force said closure back within said paste, an adjusting screw carried by said closure adapted to engage said cap for adjusting the distance that said closure is forced inwardly by said cap, and means for preventing rotation of said closure while said screw is being adjusted.

2. In combination with a paste container having a discharge nipple, an attachment having a passage therethrough through which paste is adapted to be discharged, a closure for said passage adapted to be forced outwardly by the discharge of said paste, said closure having a head adapted to engage portions within said passage thereby limiting the outward movement of said paste, a cap for said attachment adapted upon application to force said closure back within said passage, an adjusting screw carried by said closure for adjusting the distance said closure is pushed back within said passage by said cap, and means for preventing rotation of said closure while said screw is being adjusted.

3. An attachment for paste containers and the like comprising a tubular member threaded for attachment to the discharge nipple of the container whereby the passage in the tubular member may be arranged in alignment with the passage in the discharge nipple, a closure disposed within the passage through the tubular member adapted to be forced outwardly therein upon the discharge of paste from the container, there being a seat formed in the passage in said tubular member upon which said closure is adapted to seat for limiting its outward movement, said closure carrying a shank adapted to be projected through the end of the tubular member, an adjusting screw carried by said shank, the tubular member being threaded to permit a closure cap to be applied thereto, the adjusting screw being adapted to be engaged by the cap when applied to force the closure back within the tubular member, and means for preventing rotation of said closure within said tubular member while the adjusting screw is being adjusted.

In testimony whereof I have signed my name to this specification.

ERNST WISROTH.